(12) United States Patent
Chuang

(10) Patent No.: US 7,116,490 B1
(45) Date of Patent: Oct. 3, 2006

(54) ZOOM LENS

(75) Inventor: Fu-Ming Chuang, Hsin Chu Hsien (TW)

(73) Assignee: Aiptek International Inc., Hsin-Chu (TW)

( * ) Notice: Subject to any disclaimer, the term of this patent is extended or adjusted under 35 U.S.C. 154(b) by 0 days.

(21) Appl. No.: 11/213,688

(22) Filed: Aug. 30, 2005

(30) Foreign Application Priority Data

Jul. 22, 2005 (TW) .............................. 94124889 A

(51) Int. Cl.
G02B 15/14 (2006.01)
G02B 9/64 (2006.01)

(52) U.S. Cl. ...................................... 359/691; 692/676
(58) Field of Classification Search ......... 359/676–692
See application file for complete search history.

(56) References Cited

U.S. PATENT DOCUMENTS

| | | | |
|---|---|---|---|
| 4,750,820 A | 6/1988 | Pareigat | |
| 5,155,629 A | 10/1992 | Ito et al. | |
| 5,179,473 A | 1/1993 | Yano et al. | |
| 6,498,688 B1* | 12/2002 | Shibayama | .................. 359/689 |
| 2005/0036210 A1* | 2/2005 | Iijima | .......................... 359/680 |
| 2005/0046959 A1* | 3/2005 | Katakura et al. | ........... 359/680 |

* cited by examiner

Primary Examiner—Scott J. Sugarman
Assistant Examiner—Darryl J. Collins
(74) Attorney, Agent, or Firm—Rosenberg, Klein & Lee

(57) ABSTRACT

A zoom lens having a high zoom ratio and also a small size is proposed. The zoom lens has a front group of lenses and a rear group of lenses. The front group of lenses has a first lens, a second lens, and a third lens. The first lens is a meniscus negative lens. The second lens is a biconcave lens negative lens. The third lens is a positive lens. The rear group of lenses has a fourth lens, a fifth lens, a sixth lens, and a seventh lens. The fourth lens is a positive lens. The fifth lens is a biconvex lens. The sixth lens is a meniscus negative lens. The seventh lens is a meniscus negative lens. The fourth and seventh lenses are aspheric lenses made of plastic material. The proposed zoom lens can meet the requirement of miniaturized size and also maintain the image quality.

8 Claims, 17 Drawing Sheets

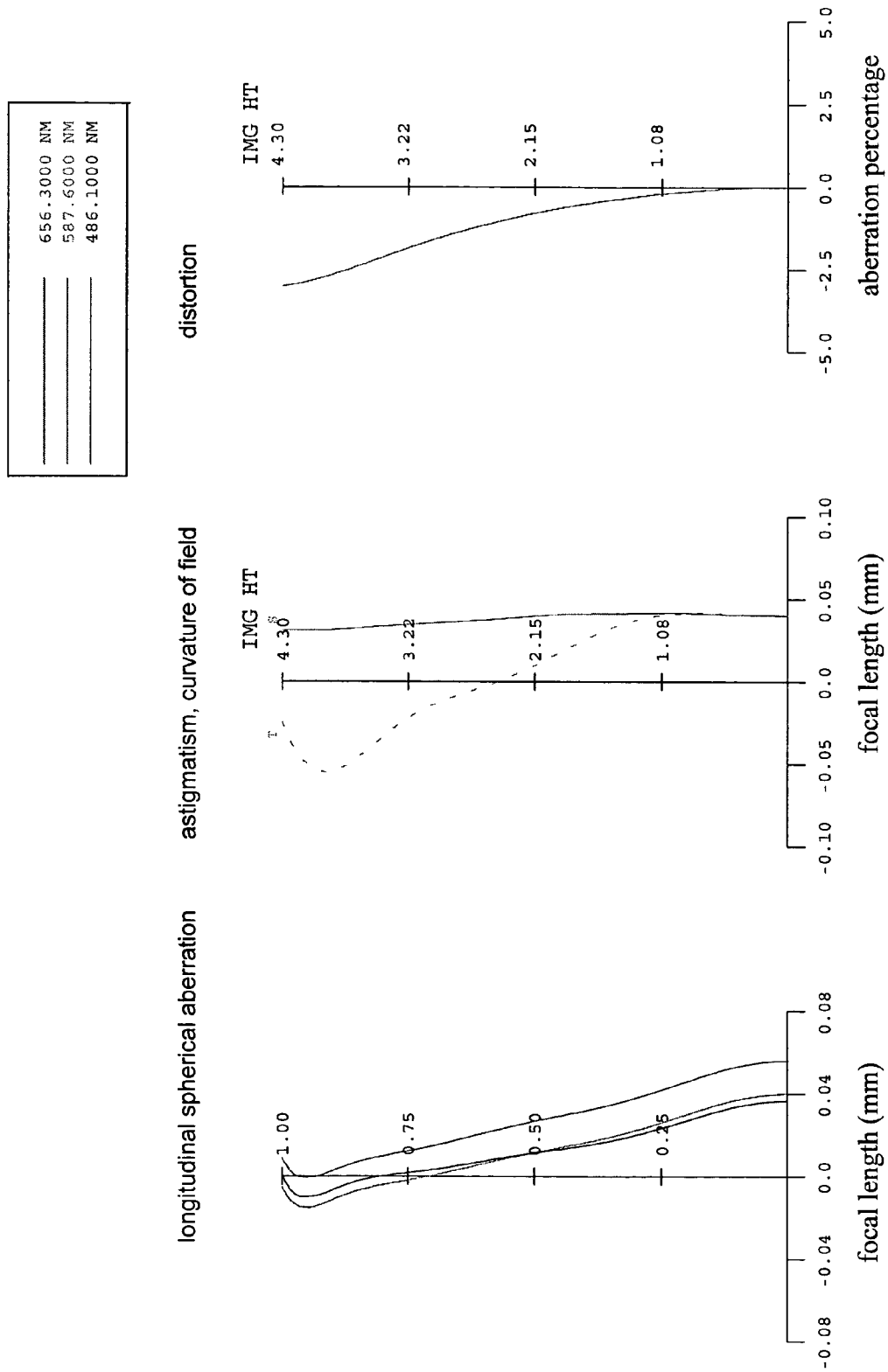

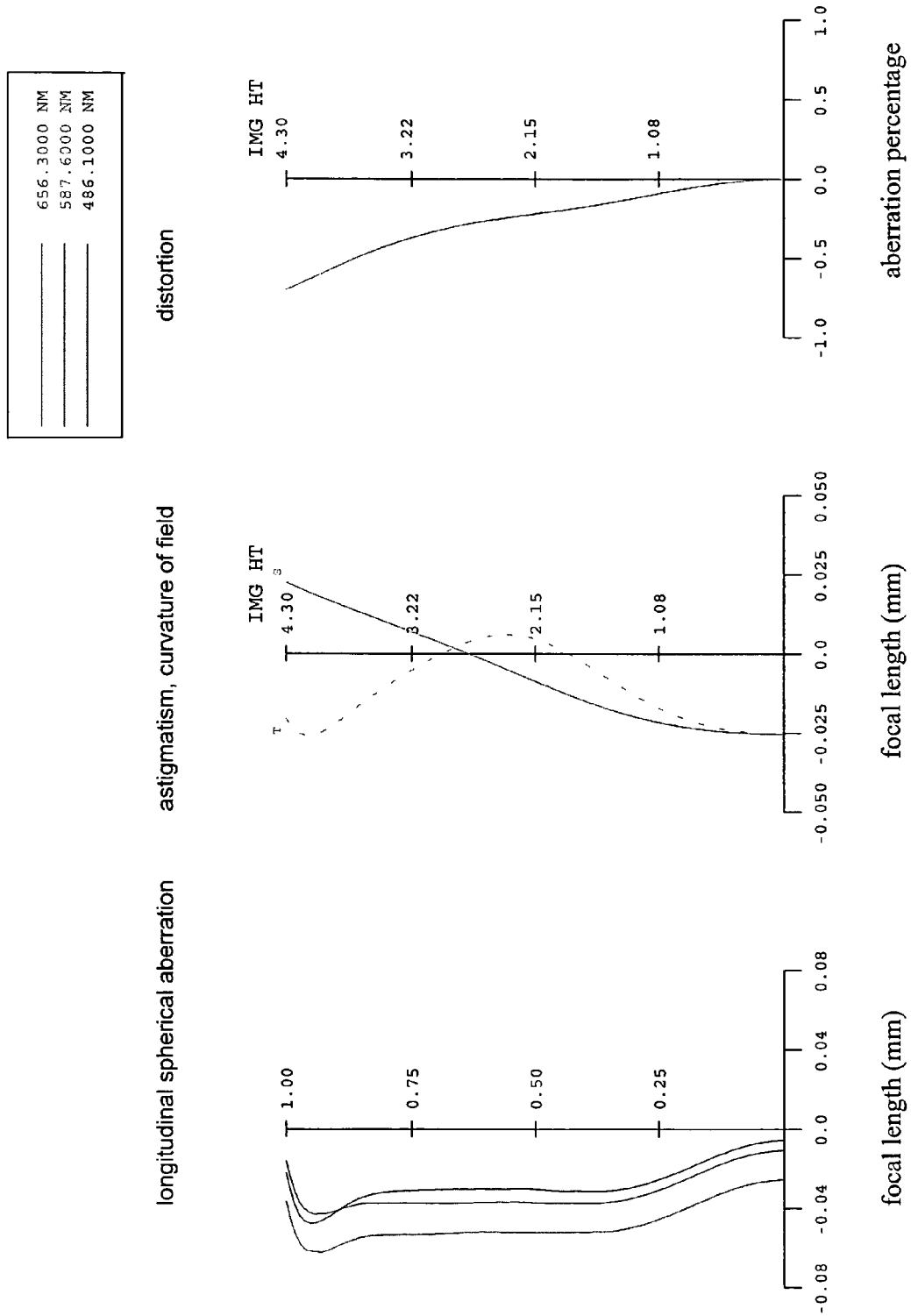

ZOOM LENS

BACKGROUND OF THE INVENTION

1. Field of the Invention

The present invention relates to a zoom lens and, more particularly, to a solid-state two-group type retrofocus zoom lens that can be used in small image capturing devices such as camcorders and digital still cameras.

2. Description of Related Art

In recent years, the trend in image capturing devices has been for miniaturization. Because zoom lenses are key components of the image capturing devices, the trend has also been for small size, lightweight, and cheap lenses.

In the prior art, the design of the two-group type zoom lens used in a camera can generally be classified into two categories. The first is the telephoto type, which is a two-group type lens having a front group with a positive diopter and a rear group with a negative diopter. The air gap between the two groups is used to change the focal length. The telephoto type zoom lens is characterized by a shorter rear focal length by moving forwards the rear principal plane of the lens.

The second is the retrofocus type, which is a two-group type lens having a front group with a negative diopter and a rear group with a positive diopter. For example, U.S. Pat. No. 5,179,473 disclosed a retrofocus zoom lens with a zoom ratio that cannot exceed 2 but only reaches 1.8, thus being not able to meet the requirement of the high zoom ratio of recent image capturing devices. Retrofocus zoom lenses are also disclosed in U.S. Pat. No. 5,155,629 and U.S. Pat. No. 4,750,820, respectively. Because the size of a zoom lens strongly depends on the image sensor size, the ratio of the total track of the zoom system to the image sensor size is a key miniaturization parameter for the size of a zoom lens. This ratio should be made as small as possible. However, this ratio is about 10 in U.S. Pat. No. 5,155,629, and it is even larger than 16 in U.S. Pat. No. 4,750,820. In U.S. Pat. No. 5,1759,473, this ratio also reaches 14.

SUMMARY OF THE INVENTION

An object of the present invention is to provide a zoom lens having a high zoom ratio and also a miniaturized size so as to reduce the volume of an image capturing device.

Another object of the present invention is to provide a zoom lens composed of aspheric lenses made of plastic material and common glass lenses so as to have the advantages of low cost, simple structure, and easy assembly.

To achieve the above objects, the present invention provides a zoom lens comprising a front group of lenses and a rear group of lenses. The front group of lenses includes a first lens, a second lens, and a third lens. The first lens is a meniscus negative lens. The second lens is a biconcave lens negative lens. The third lens is a positive lens. The rear group of lenses includes a fourth lens, a fifth lens, a sixth lens, and a seventh lens. The fourth lens is a positive lens. The fifth lens is a biconvex lens. The sixth lens is a meniscus negative lens. The seventh lens is a meniscus negative lens. The fourth and seventh lenses are aspheric lenses made of plastic material. The zoom lens meets the following conditions:

$1.42 < d_{12}/\phi_{11} < 1.73$ (a)

$1.20 < e_{13}/d_{13} < 1.36$ (b)

$1.2 \leq f_2/f_w < 1.3$ (c)

where $d_{12}$ is the axial distance between the sixth lens and the seventh lens, $\phi_{11}$ is the radial height of the sixth lens, $e_{13}$ is the outer edge thickness of the seventh lens, $d_{13}$ is the central thickness of the seventh lens, $f_2$ is the focal length of the rear group, and $f_w$ is the focal length at a large viewing angle.

BRIEF DESCRIPTION OF THE DRAWINGS

The various objects and advantages of the present invention will be more readily understood from the following detailed description when read in conjunction with the appended drawing, in which:

FIG. 2B is an image graph at a large viewing angle according to the first embodiment of the present invention;

FIG. 2C is an image graph at a moderate viewing angle according to the first embodiment of the present invention;

DETAILED DESCRIPTION OF THE PREFERRED EMBODIMENTS

Figure 1:
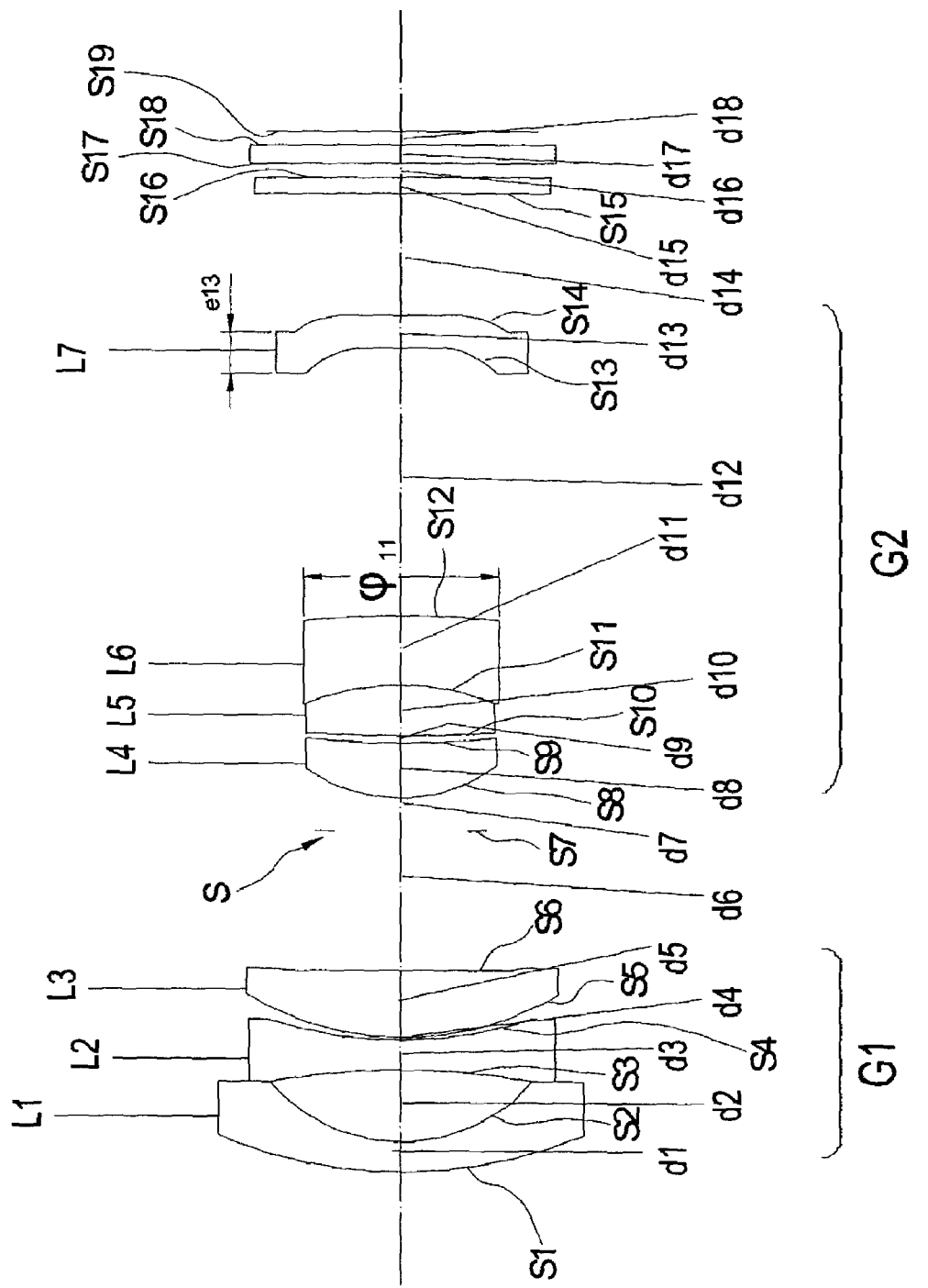
FIG. 1 is a deployment diagram of each lens of a zoom lens of the present invention.

As shown in FIG. 1, a zoom lens of the present invention is composed of seven lenses. The zoom lens comprises a front group G1 of lenses and a rear group G2 of lenses. The front group G1 has a negative diopter, while the rear group G2 has a positive diopter. Variation of the air gap formed between the front group G1 and the rear group G2, i.e., the spacing in the axial direction between the front group G1 and the rear group G2 is exploited to change the focal length of this lens system.

In a preferred embodiment of the present invention, the front group G1 includes a first lens L1, a second lens L2, and a third lens L3. The first lens L1 is a meniscus negative lens. The second lens L2 is a biconcave lens negative lens. The third lens L3 is a positive lens. The rear group G2 includes a fourth lens L4, a fifth lens L5, a sixth lens L6, and a seventh lens L7. The fourth lens L4 is a positive lens. The fifth lens L5 is a biconvex lens. The sixth lens L6 is a meniscus negative lens. The seventh lens L7 is a meniscus negative lens. The S in front of the fourth lens L4 means the diaphragm. In the present invention, it is preferred that the fourth lens L4 and the seventh lens L7 are aspheric lenses made of plastic material, and other lenses can be common glass lenses, thus effectively reducing the device cost. Because aspheric lenses, especially the seventh lens L7, can effectively eliminate the off axis aberration, the present invention still has a miniaturized size and can also maintain the image quality. In FIG. 1, S1–S19 are surface numbers of the lenses, while d1–d18 are axial distances between the lenses.

In a preferred embodiment of the present invention, the fifth lens L5 and the sixth lens L6 can be cemented together to form a doublet lens, as shown in FIG. 1, i.e., viewed as a lens surface S11 with no distance. This can simplify the assembly process of the zoom lens, and has also the advantage of easy assembly.

In order to have a miniaturized size and also maintain the image quality, the zoom lens of the present invention meets the following conditions, i.e., has the following characteristics:

condition (a): $1.42 < d_{12}/\phi_{11} < 1.73$;

condition (b): $1.20 < e_{13}/d_{13} < 1.36$;

condition (c): $1.2 < f_2/f_w < 1.3$;

where $d_{12}$ is the axial distance between the sixth lens L6 and the seventh lens L7 (i.e., the distance between S12 and S13), $\phi_{11}$ is the radial height of the sixth lens L6, $e_{13}$ is the outer edge thickness of the seventh lens L7, $d_{13}$ is the central thickness of the seventh lens L7, $f_2$ is the focal length of the rear group G2, and $f_w$, is the focal length at a large viewing angle.

The present invention will be exemplified with the following four embodiments.

The First Embodiment

Figure 2A:
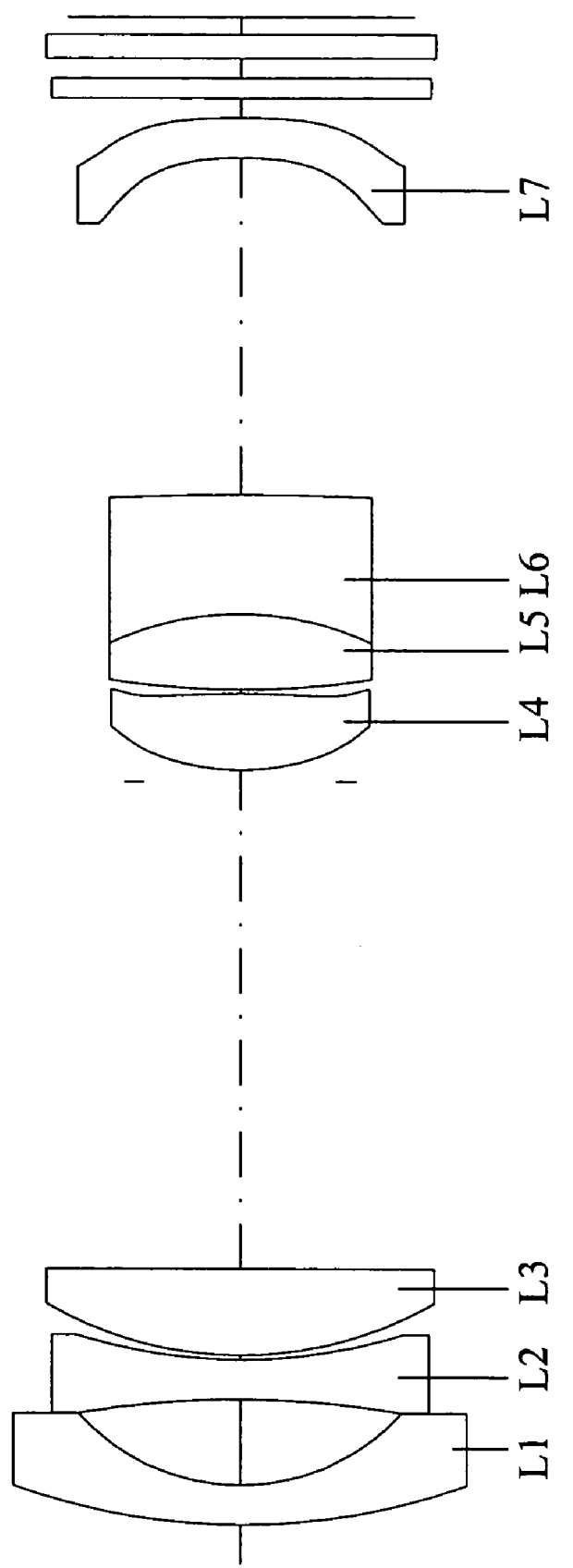
FIG. 2A is a diagram showing the location of each lens at a large viewing angle according to a first embodiment of the present invention.
Figure 2D:
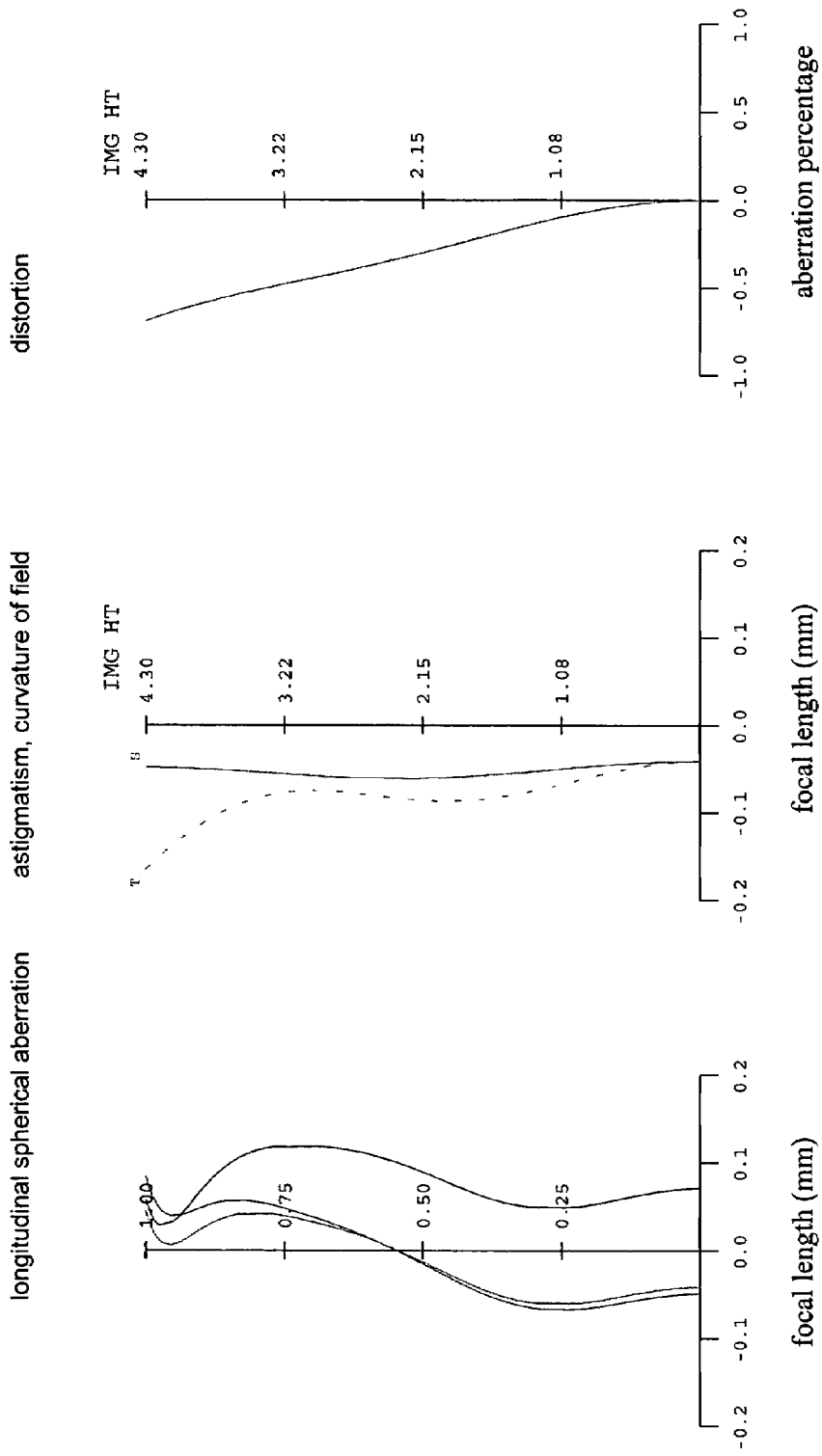
FIG. 2D is an image graph at a small viewing angle according to the first embodiment of the present invention.

FIG. 2A is a diagram showing the location of each lens at a large viewing angle according to a first embodiment of the present invention. FIG. 2B is an image graph at a large viewing angle according to the first embodiment of the present invention. FIG. 2C is an image graph at a moderate viewing angle according to the first embodiment of the present invention. FIG. 2D is an image graph at a small viewing angle according to the first embodiment of the present invention. FIG. 2A is roughly the same as FIG. 1. They only differ in the shapes and distances of part of the lenses. In order to make the figure more succinct, the labels S1–S19 and d1–d18 are omitted. This is also done in the figures of the following embodiments.

The elementary optical characteristics of the first embodiment are: $F_{no}$=1:3.65–6.81, f=7.53–21.60, w=29.7°–11.1°, where $F_{no}$ represents the aperture of the diaphragm, f represents the system focal length, and w represents the half viewing angle. Reference is made to Table 1 for the data of these parameters. In Table 1, r represents the radius of curvature of each lens surface, d represents the axial distance between the lenses, n represents the index of refraction of each lens surface, v represents the abbe value of each lens surface. The abbe value relates to the chromatic aberration characteristic of material, and is inversely proportional to the magnitude of chromatic aberration.

TABLE 1

| surface | r | d | n | v |
|---|---|---|---|---|
| S1 | 16.477 | 1.00 | 1.72824 | 28.4 |
| S2 | 5.352 | 2.15 | | |
| S3 | −23.302 | 1.00 | 1.64530 | 55.8 |
| S4 | 13.484 | 0.11 | | |
| S5 | 9.531 | 2.17 | 1.80517 | 25.4 |
| S6 | infinite | d6 | | |
| S7 | infinite | 0.30 | | |
| S8 | A(1) | 1.92 | 1.49175 | 57.5 |
| S9 | A(2) | 0.10 | | |
| S10 | 21.000 | 1.90 | 1.50679 | 56.8 |
| S11 | −7.579 | 3.01 | 1.80517 | 25.4 |
| S12 | −74.662 | 8.51 | | |
| S13 | A(3) | 1.00 | 1.58546 | 29.9 |
| S14 | A(4) | d14 | | |
| S15 | infinite | 0.50 | 1.51679 | 64.1 |
| S16 | infinite | 0.50 | | |
| S17 | infinite | 0.60 | 1.51632 | 64.1 |
| S18 | infinite | 0.44 | | |
| S19 | infinite | 0.00 | | |

In the zoom lens, the lens surfaces S8, S9, S13, and S14 are asperic surfaces with aspheric coefficient data listed below.

| ASPHERIC | CURV | K<br>E | A<br>F | B<br>G | C<br>H | D<br>J |
|---|---|---|---|---|---|---|
| A(1) | 0.16284565 | 0.000000<br>−1.34692E−06 | 5.18684E−04<br>1.59174E−07 | 1.52252E−04<br>−7.72594E−09 | −2.55142E−05<br>0.00000E+00 | 7.69051E−06<br>0.00000E+00 |
| A(2) | −0.04332059 | 0.000000<br>−4.77924E−06 | 1.04124E−03<br>5.00281E−07 | 3.05539E−04<br>−2.15897E−08 | −8.93235E−05<br>0.00000E+00 | 2.73637E−05<br>0.00000E+00 |
| A(3) | −0.10310808 | 0.000000<br>0.00000E+00 | −8.76392E−03<br>0.00000E+00 | 6.88844E−04<br>0.00000E+00 | −1.08332E−04<br>0.00000E+00 | 5.51689E−06<br>0.00000E+00 |
| A(4) | −0.03336562 | 0.000000<br>−8.77444E−07 | −7.39172E−03<br>3.69356E−08 | 8.09028E−04<br>−6.61600E−10 | −1.26342E−04<br>0.00000E+00 | 1.29557E−05<br>0.00000E+00 |

The variables d6 and d14 are related as follows with respect to different zoom positions:

| | Z1 | Z2 | Z3 |
|---|---|---|---|
| $F_{no}$ | 3.65 | 4.86 | 6.81 |
| f | 7.53 | 12.94 | 21.60 |

-continued

|    | Z1    | Z2    | Z3    |
|----|-------|-------|-------|
| w  | 29.7° | 18.3° | 11.1° |
| d6 | 12.30 | 5.23  | 1.30  |
| d14| 0.50  | 4.36  | 10.49 |

The axial equation of the above aspheric surface can be expressed as:

$$Z = \frac{(curv)Y^2}{1 + (1-(1+K)(curv)^2 Y^2)} + (A)Y^4 + (B)Y^6 + (C)Y^8 + (D)Y^{10} + (E)Y^{12} + (F)Y^{14} + (G)Y^{16}(H)Y^{18} + (J)Y^{20}$$

where Z is the sag, curv means the curvature, K is the quadratic surface constant, Y is the height perpendicular to the optical axis of the lens, A is the fourth-order aspheric surface coefficient, B is the sixth-order aspheric surface coefficient, C is the eighth-order aspheric surface coefficient, D is the tenth-order aspheric surface coefficient, E is the twelfth-order aspheric surface coefficient, F is the fourteenth-order aspheric surface coefficient, G is the sixteenth-order aspheric surface coefficient, H is the eighteenth-order aspheric surface coefficient, and J is the twentieth-order aspheric surface coefficient.

The Second Embodiment

Figure 3A:
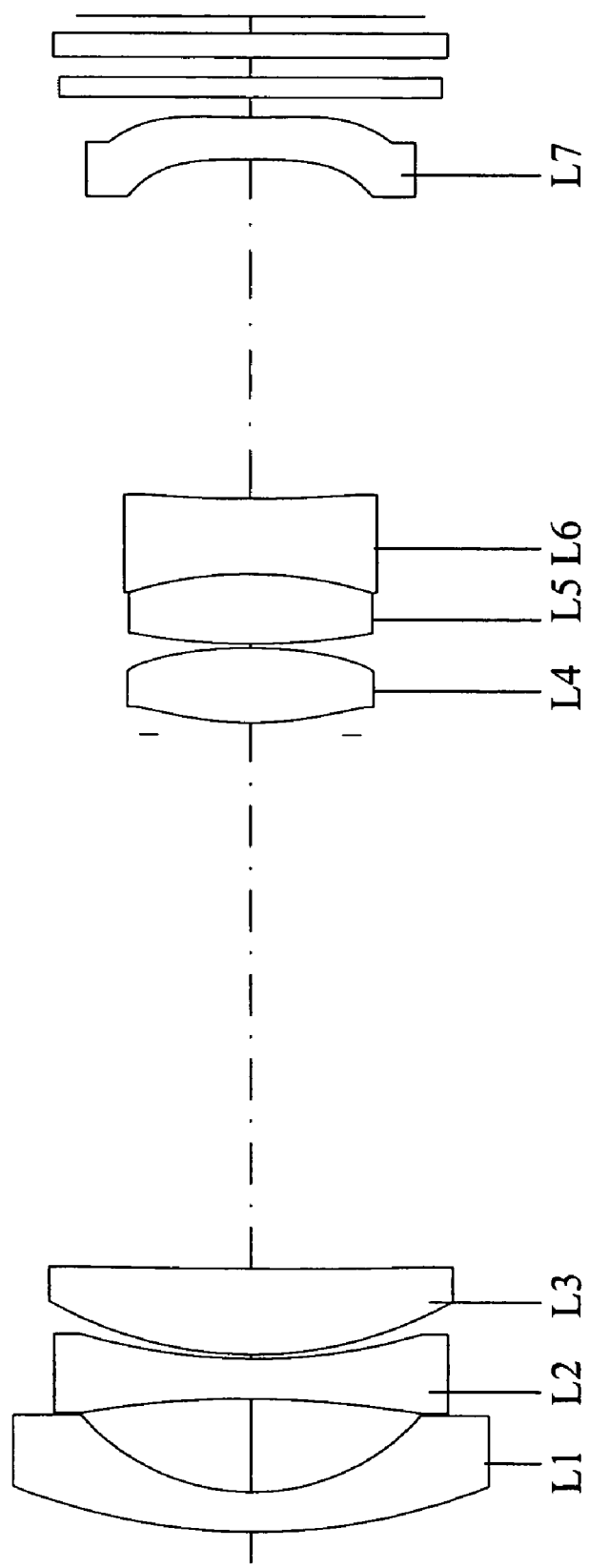
FIG. 3A is a diagram showing the location of each lens at a large viewing angle according to a second embodiment of the present invention.
Figure 3B:
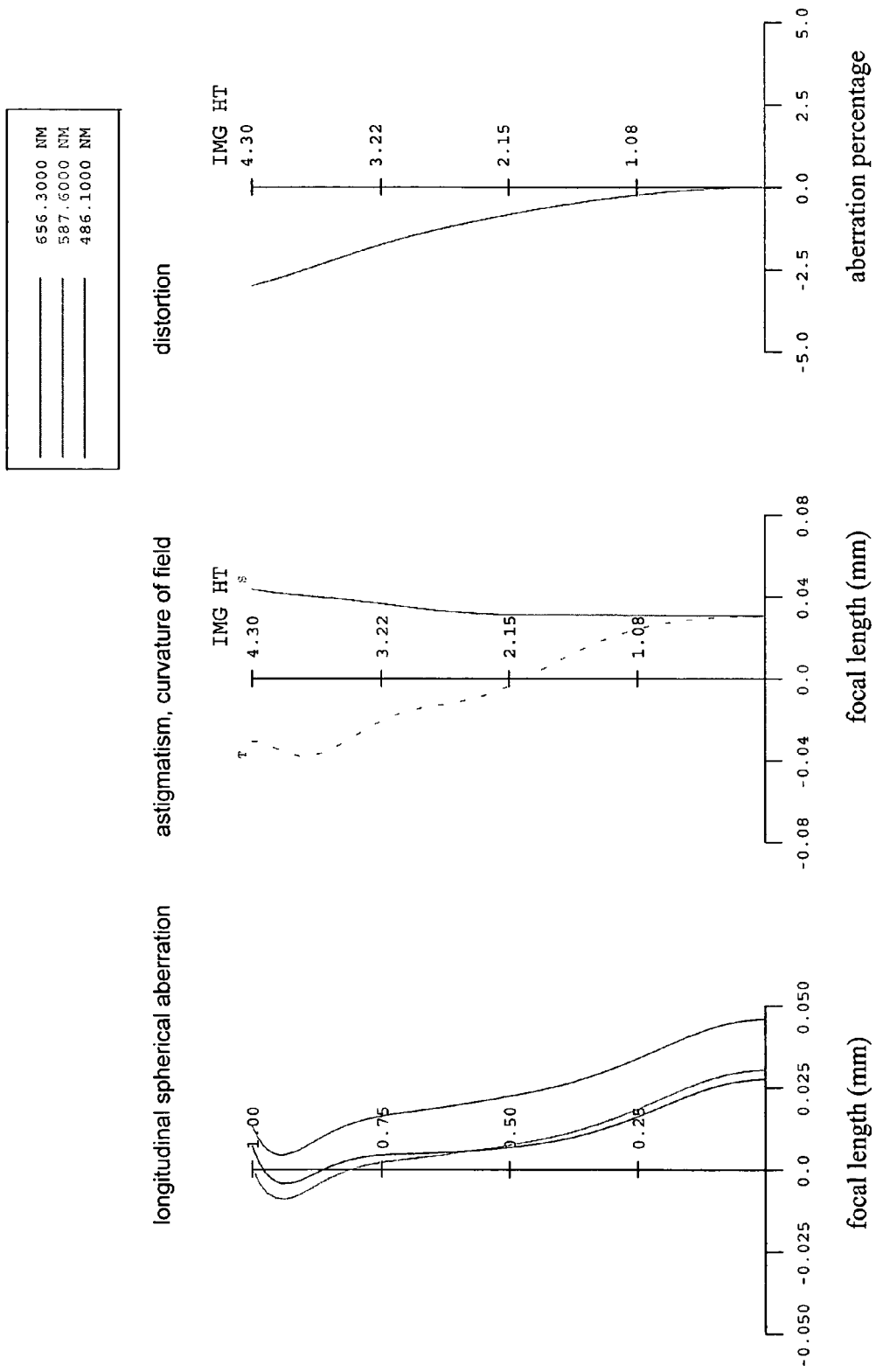
FIG. 3B is an image graph at a large viewing angle according to the second embodiment of the present invention.
Figure 3C:
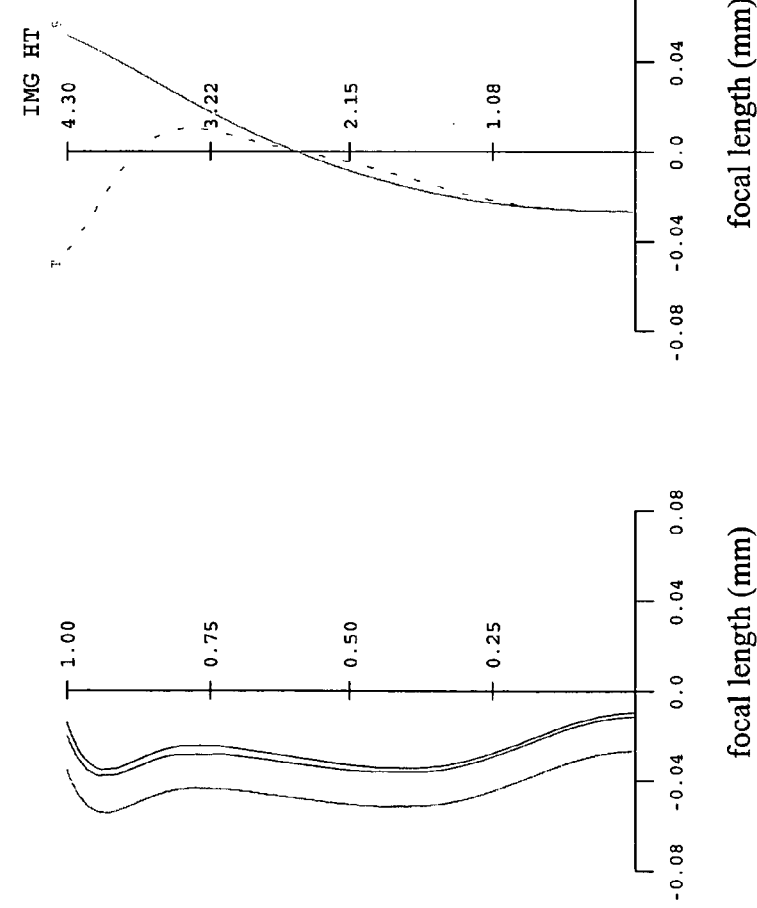
FIG. 3C is an image graph at a moderate viewing angle according to the second embodiment of the present invention.
Figure 3C:
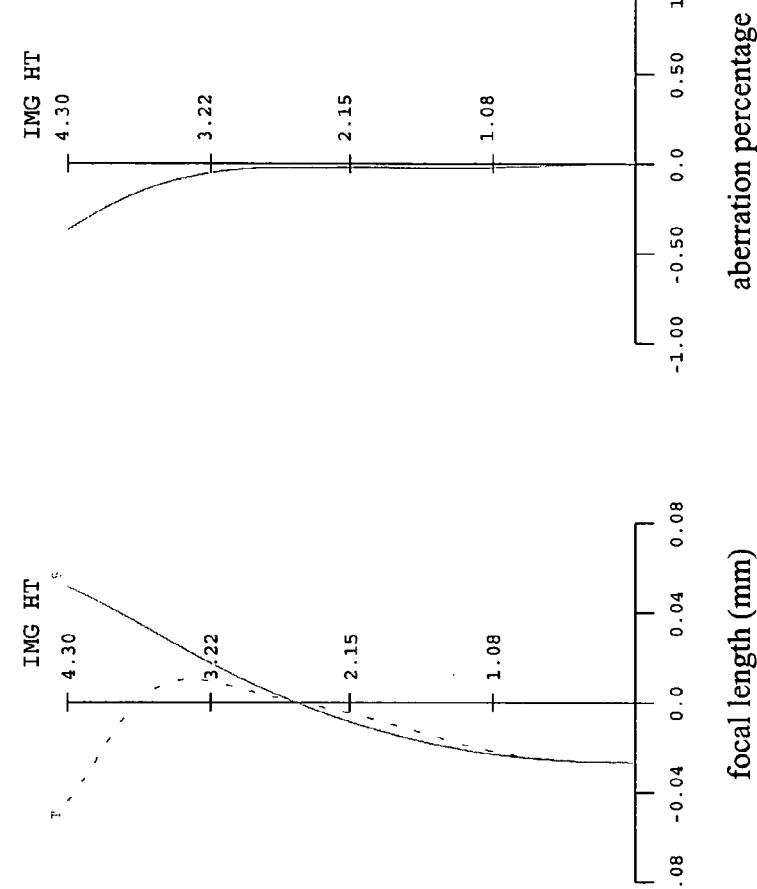
Figure 3C:
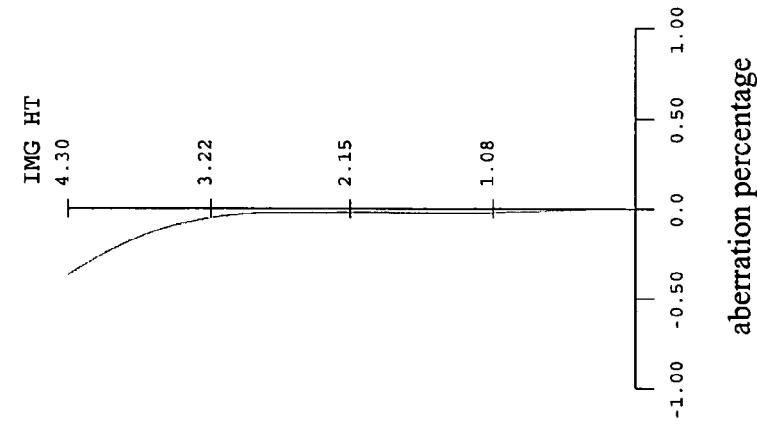
Figure 3D:
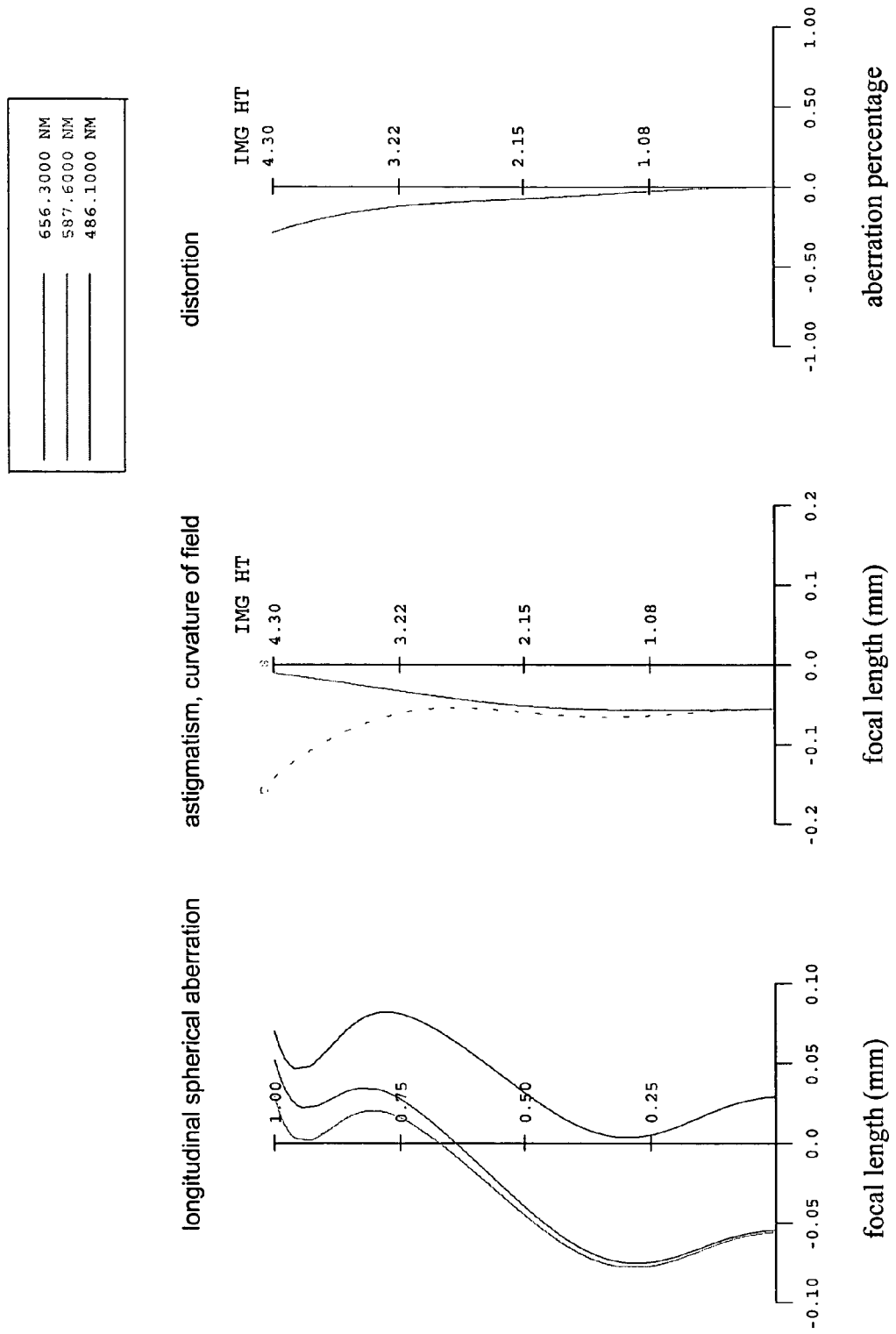
FIG. 3D is an image graph at a small viewing angle according to the second embodiment of the present invention.

FIG. 3A is a diagram showing the location of each lens at a large viewing angle according to a second embodiment of the present invention. FIG. 3B is an image graph at a large viewing angle according to the second embodiment of the present invention. FIG. 3C is an image graph at a moderate viewing angle according to the second embodiment of the present invention. FIG. 3D is an image graph at a small viewing angle according to the second embodiment of the present invention.

The elementary optical characteristics of the second embodiment are: $F_{no}=1:3.65–6.81$, $f=7.53–20.94$, $w=30.5°–11.5°$, where $F_{no}$ represents the aperture of the diaphragm, f represents the system focal length, and w represents the half viewing angle. Reference is made to Table 2 for the data of these parameters. In Table 2, r represents the radius of curvature of each lens surface, d represents the axial distance between the lenses, n represents the index of refraction of each lens surface, v represents the abbe value of each lens surface.

TABLE 2

| surface | r       | d    | n       | v    |
|---------|---------|------|---------|------|
| S1      | 15.491  | 1.00 | 1.72824 | 28.4 |
| S2      | 5.548   | 2.33 |         |      |
| S3      | −24.226 | 1.00 | 1.63095 | 58.3 |
| S4      | 14.706  | 0.10 |         |      |
| S5      | 9.950   | 2.14 | 1.80517 | 25.4 |
| S6      | 178.490 | d6   |         |      |
| S7      | infinite| 0.30 |         |      |
| S8      | A(1)    | 1.87 | 1.52539 | 56.2 |
| S9      | A(2)    | 0.10 |         |      |
| S10     | 16.876  | 1.75 | 1.50784 | 59.5 |
| S11     | −9.869  | 1.89 | 1.79801 | 25.6 |
| S12     | 34.275  | 8.52 |         |      |
| S13     | A(3)    | 1.05 | 1.52539 | 56.2 |
| S14     | A(4)    | d14  |         |      |
| S15     | infinite| 0.50 | 1.51679 | 64.1 |
| S16     | infinite| 0.50 |         |      |
| S17     | infinite| 0.60 | 1.51632 | 64.1 |
| S18     | infinite| 0.44 |         |      |
| S19     | infinite| 0.00 |         |      |

In the zoom lens, the lens surfaces S8, S9, S13, and S14 are aspheric surfaces with aspheric coefficient data listed below.

| ASPHERIC | CURV | K<br>E | A<br>F | B<br>G | C<br>H | D<br>J |
|----------|------|--------|--------|--------|--------|--------|
| A(1)     | 0.11842054  | 0.000000<br>−1.51626E−06 | −8.64755E−04<br>1.59138E−07 | 5.61637E−05<br>−7.72594E−09 | −3.89544E−05<br>0.00000E+00 | 8.64668E−06<br>0.00000E+00 |
| A(2)     | −0.09387103 | 0.000000<br>−4.90176E−06 | −6.24690E−04<br>5.00319E−07 | 1.66107E−04<br>−2.15849E−08 | −9.55553E−05<br>0.00000E+00 | 2.66903E−05<br>0.00000E+00 |
| A(3)     | −0.02675990 | 0.000000<br>0.00000E+00  | −9.91816E−03<br>0.00000E+00 | 4.20993E−04<br>0.00000E+00 | −6.02031E−05<br>0.00000E+00 | 1.95370E−06<br>0.00000E+00 |
| A(4)     | 0.04780176  | 0.000000<br>−9.07186E−07 | −9.00400E−03<br>4.50373E−08 | 7.00474E−04<br>−9.47655E−10 | −9.90318E−05<br>0.00000E+00 | 1.10701E−05<br>0.00000E+00 |

The variables d6 and d14 are related as follows with respect to different zoom positions:

|     | Z1    | Z2    | Z3    |
|-----|-------|-------|-------|
| $F_{no}$ | 3.65  | 4.86  | 6.81  |
| f   | 7.30  | 12.55 | 20.94 |
| w   | 30.5° | 18.8° | 11.5° |
| d6  | 13.40 | 5.66  | 1.35  |
| d14 | 0.50  | 3.96  | 9.49  |

The Third Embodiment

Figure 4A:
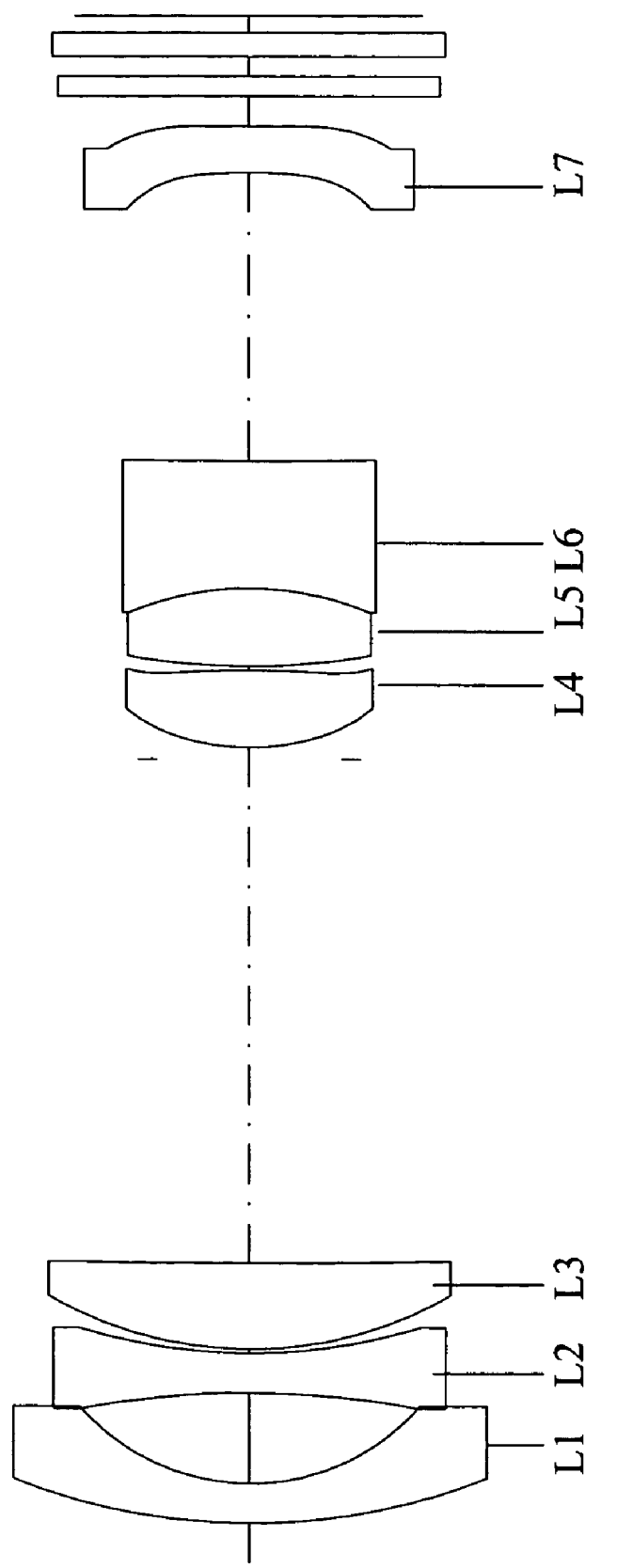
FIG. 4A is a diagram showing the location of each lens at a large viewing angle according to a third embodiment of the present invention.
Figure 4B:
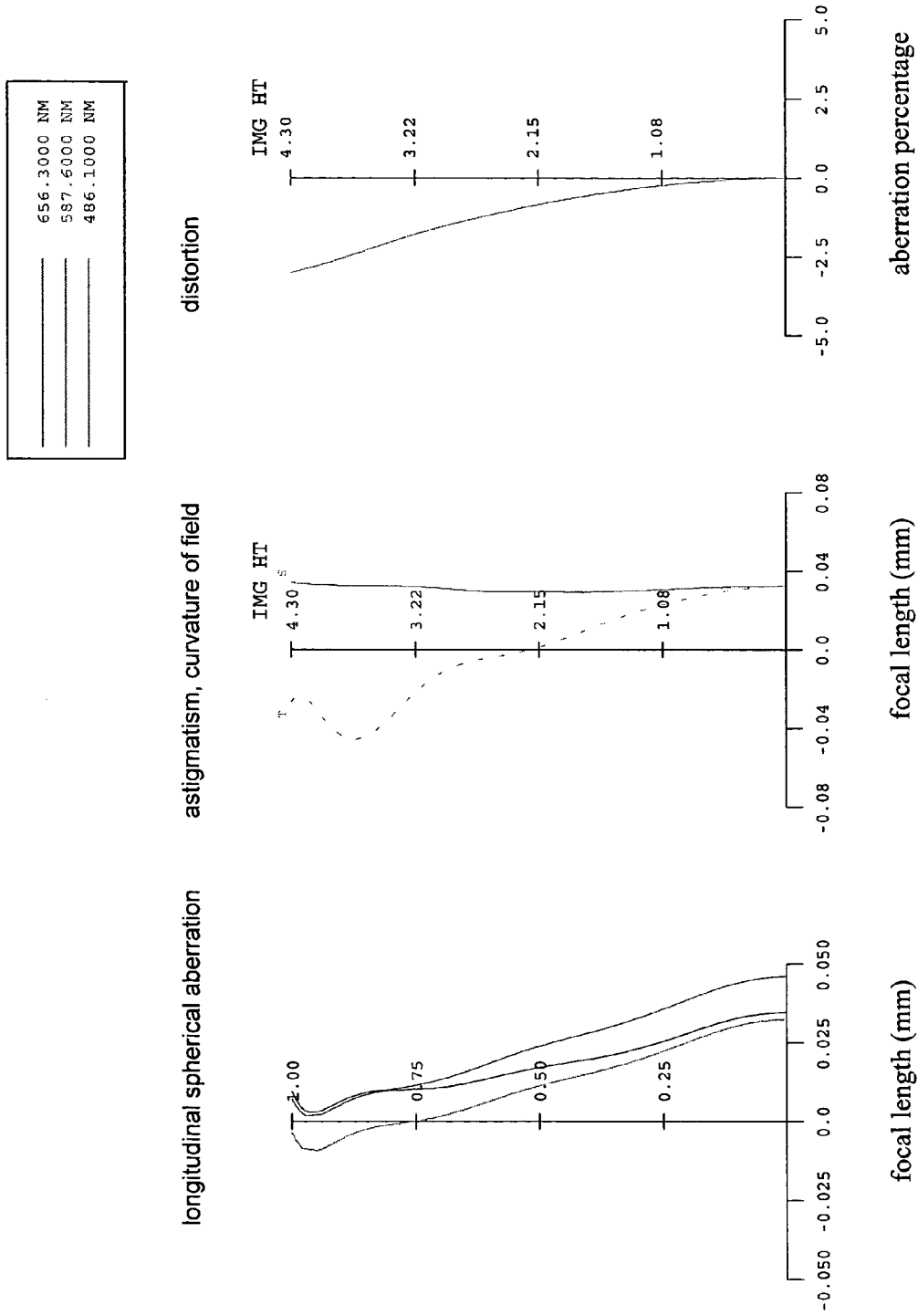
FIG. 4B is an image graph at a large viewing angle according to the third embodiment of the present invention.
Figure 4C:
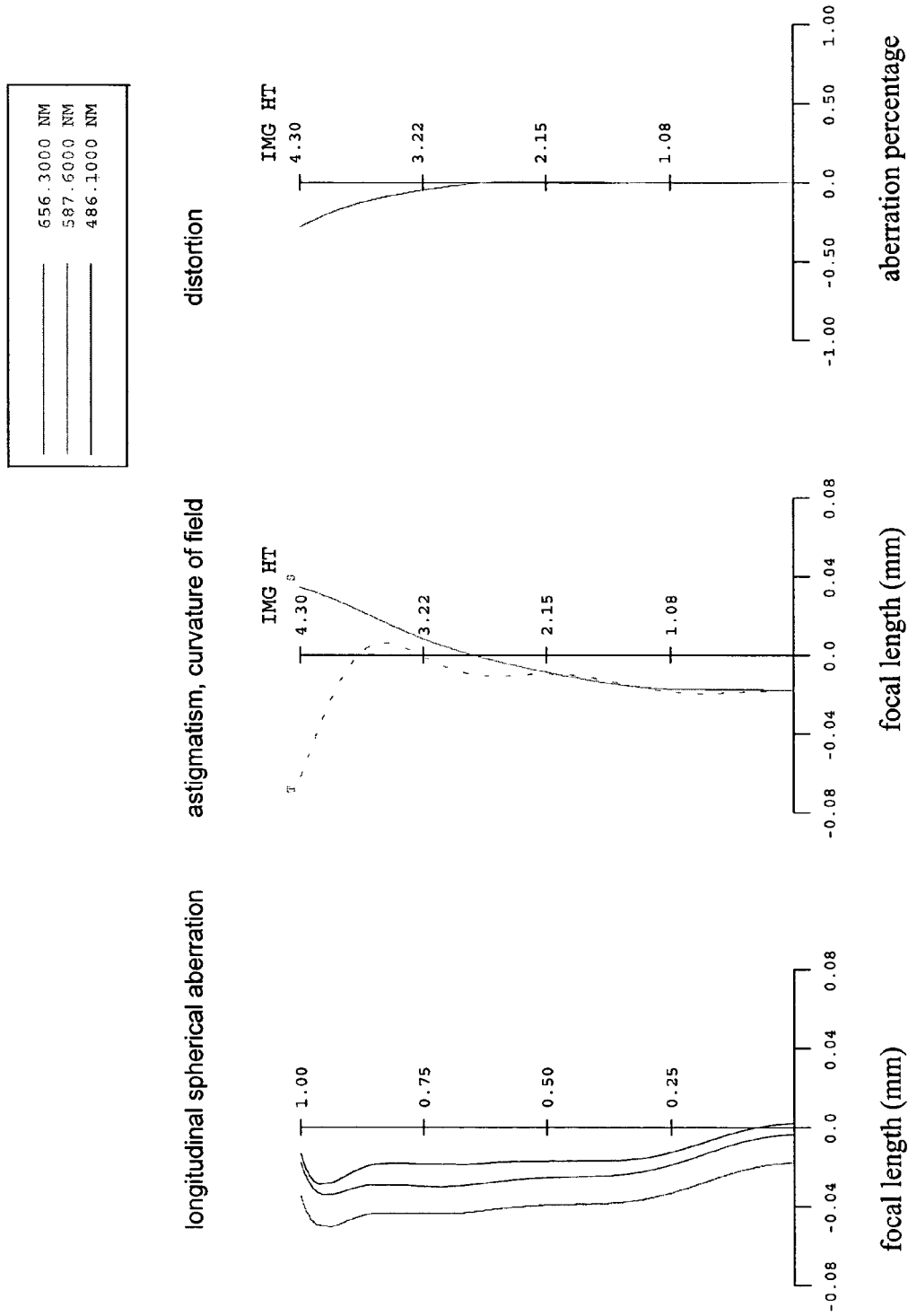
FIG. 4C is an image graph at a moderate viewing angle according to the third embodiment of the present invention.
Figure 4D:
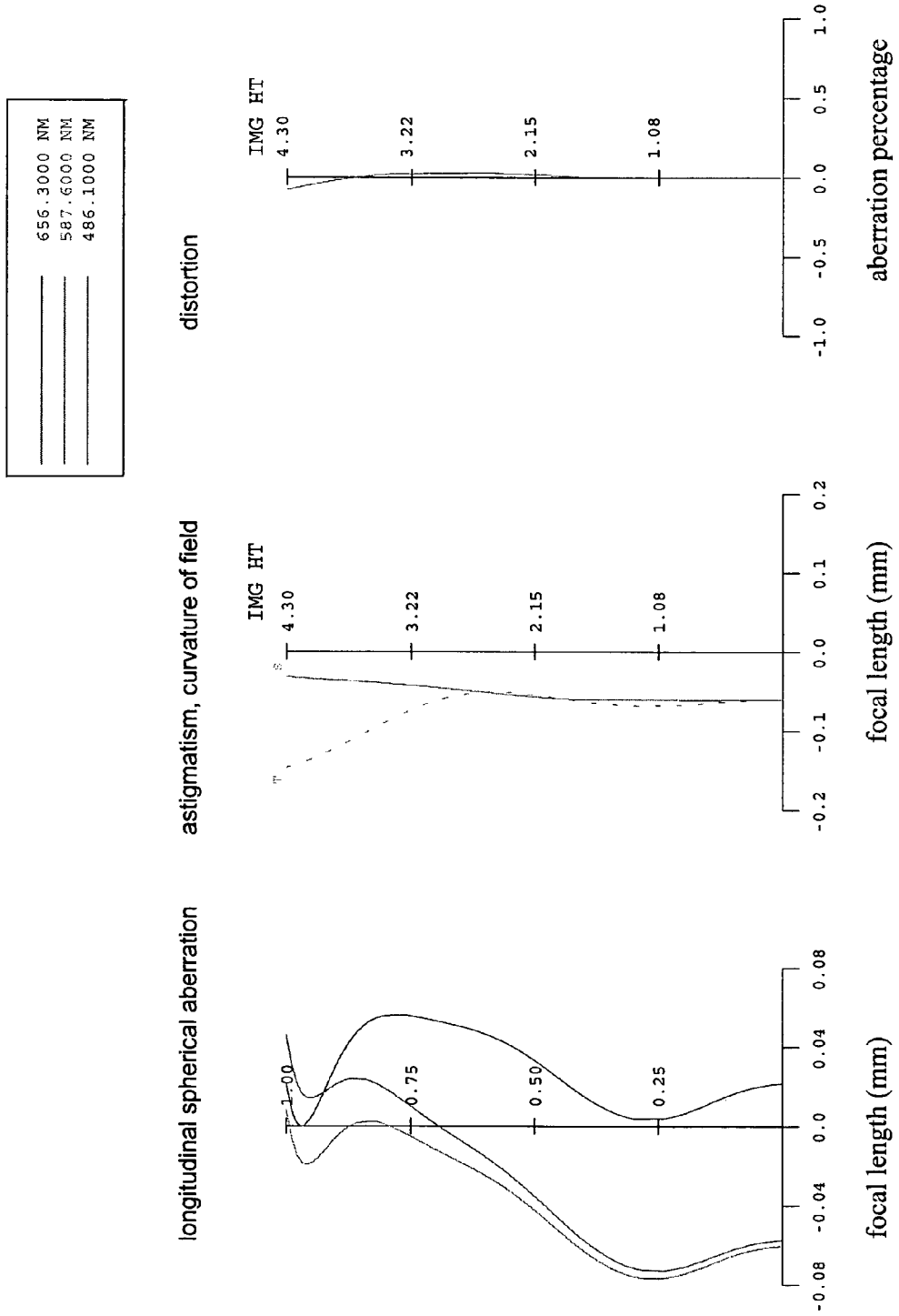
FIG. 4D is an image graph at a small viewing angle according to the third embodiment of the present invention.

FIG. 4A is a diagram showing the location of each lens at a large viewing angle according to a third embodiment of the present invention. FIG. 4B is an image graph at a wide viewing angle according to the third embodiment of the present invention. FIG. 4C is an image graph at a moderate viewing angle according to the third embodiment of the present invention. FIG. 4D is an image graph at a small viewing angle according to the third embodiment of the present invention.

The elementary optical characteristics of the third embodiment are: $F_{no}$=1:3.65–6.81, f=7.57–21.72, w=29.5°–11.1°, where $F_{no}$ represents the aperture of the diaphragm, f represents the system focal length, and w represents the half viewing angle. Reference is made to Table 3 for the data of these parameters. In Table 2, r represents the radius of curvature of each lens surface, d represents the axial distance between the lenses, n represents the index of refraction of each lens surface, v represents the abbe value of each lens surface.

TABLE 3

| surface | r | d | n | v |
|---|---|---|---|---|
| S1 | 15.500 | 1.00 | 1.72824 | 28.44 |
| S2 | 5.495 | 2.28 | | |
| S3 | −23.059 | 1.00 | 1.62040 | 60.29 |
| S4 | 13.988 | 0.10 | | |
| S5 | 9.757 | 2.16 | 1.80517 | 25.40 |
| S6 | 206.708 | d6 | | |
| S7 | infinite | 0.30 | | |
| S8 | A(1) | 1.94 | 1.49175 | 57.45 |
| S9 | A(2) | 0.10 | | |
| S10 | 17.214 | 1.96 | 1.51426 | 53.97 |
| S11 | −7.582 | 3.21 | 1.80517 | 25.40 |
| S12 | 148.375 | 7.28 | | |
| S13 | A(3) | 1.17 | 1.52539 | 56.24 |
| S14 | A(4) | d14 | | |
| S15 | infinite | 0.50 | 1.51679 | 64.14 |
| S16 | infinite | 0.50 | | |
| S17 | infinite | 0.60 | 1.51632 | 64.11 |
| S18 | infinite | 0.44 | | |
| S19 | infinite | 0.00 | | |

In the zoom lens, the lens surfaces S8, S9, S13, and S14 are aspheric surfaces with aspheric coefficient data listed below.

| ASPHERIC | CURV | K<br>E | A<br>F | B<br>G | C<br>H | D<br>J |
|---|---|---|---|---|---|---|
| A(1) | 0.16733330 | 0.000000<br>−1.31711E−06 | 3.87023E−04<br>1.56713E−07 | 1.53490E−04<br>−7.72594E−09 | −2.72088E−05<br>0.00000E+00 | 7.70980E−06<br>0.00000E+00 |
| A(2) | −0.04754425 | 0.000000<br>−4.80181E−06 | 9.46907E−04<br>5.00281E−07 | 2.99409E−04<br>−2.15897E−08 | −9.07047E−05<br>0.00000E+00 | 2.76154E−05<br>0.00000E+00 |
| A(3) | −0.05119287 | 0.000000<br>0.00000E+00 | −7.80694E−03<br>0.00000E+00 | 1.17607E−04<br>0.00000E+00 | −2.22742E−05<br>0.00000E+00 | 5.58135E−07<br>0.00000E+00 |
| A(4) | 0.02726857 | 0.000000<br>−1.37049E−06 | −6.59119E−03<br>8.29029E−08 | 3.73275E−04<br>−1.99862E−09 | −6.81632E−05<br>0.00000E+00 | 1.20272E−05<br>0.00000E+00 |

The variables d6 and d14 are related as follows with respect to different zoom positions:

| | Z1 | Z2 | Z3 |
|---|---|---|---|
| $F_{no}$ | 3.65 | 4.86 | 6.81 |
| f | 7.57 | 13.02 | 21.72 |
| w | 29.5° | 18.2° | 11.1° |
| d6 | 12.72 | 5.41 | 1.34 |
| d14 | 0.75 | 4.39 | 10.22 |

The Fourth Embodiment

Figure 5A:
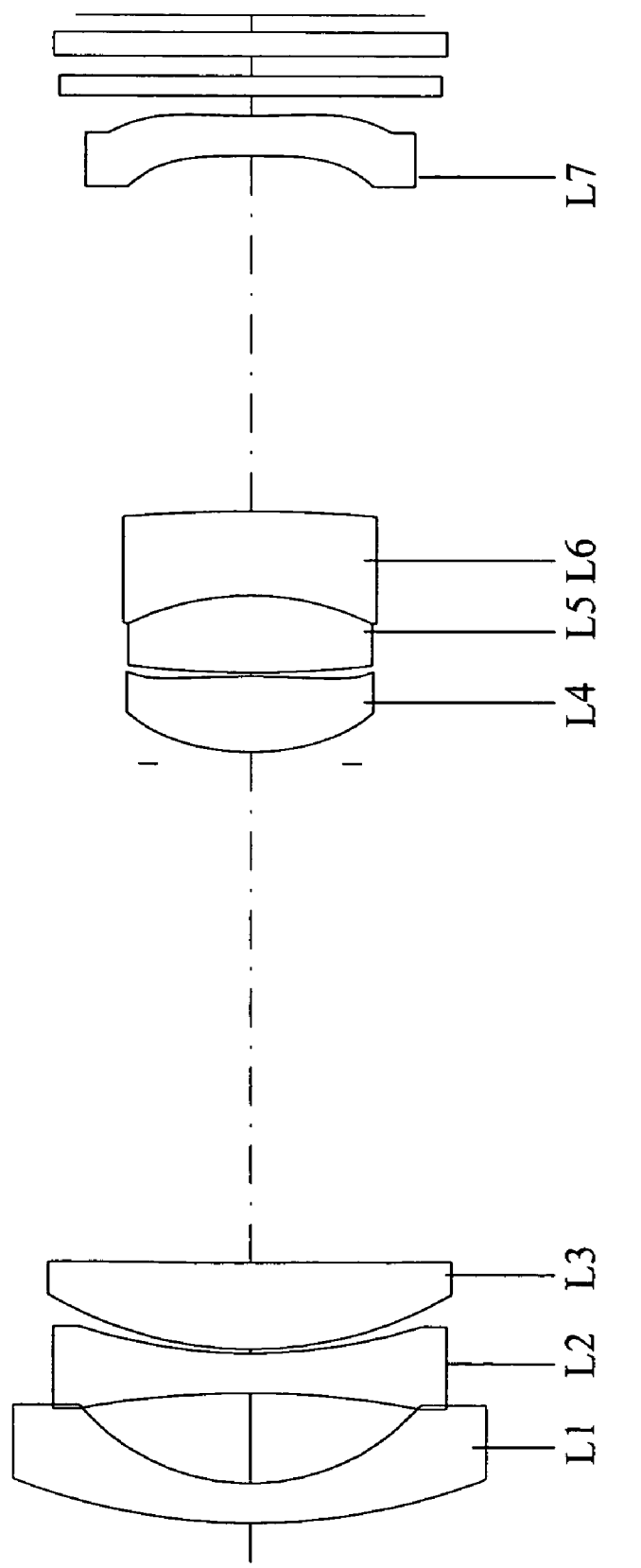
FIG. 5A is a diagram showing the location of each lens at a large viewing angle according to a fourth embodiment of the present invention.
Figure 5B:
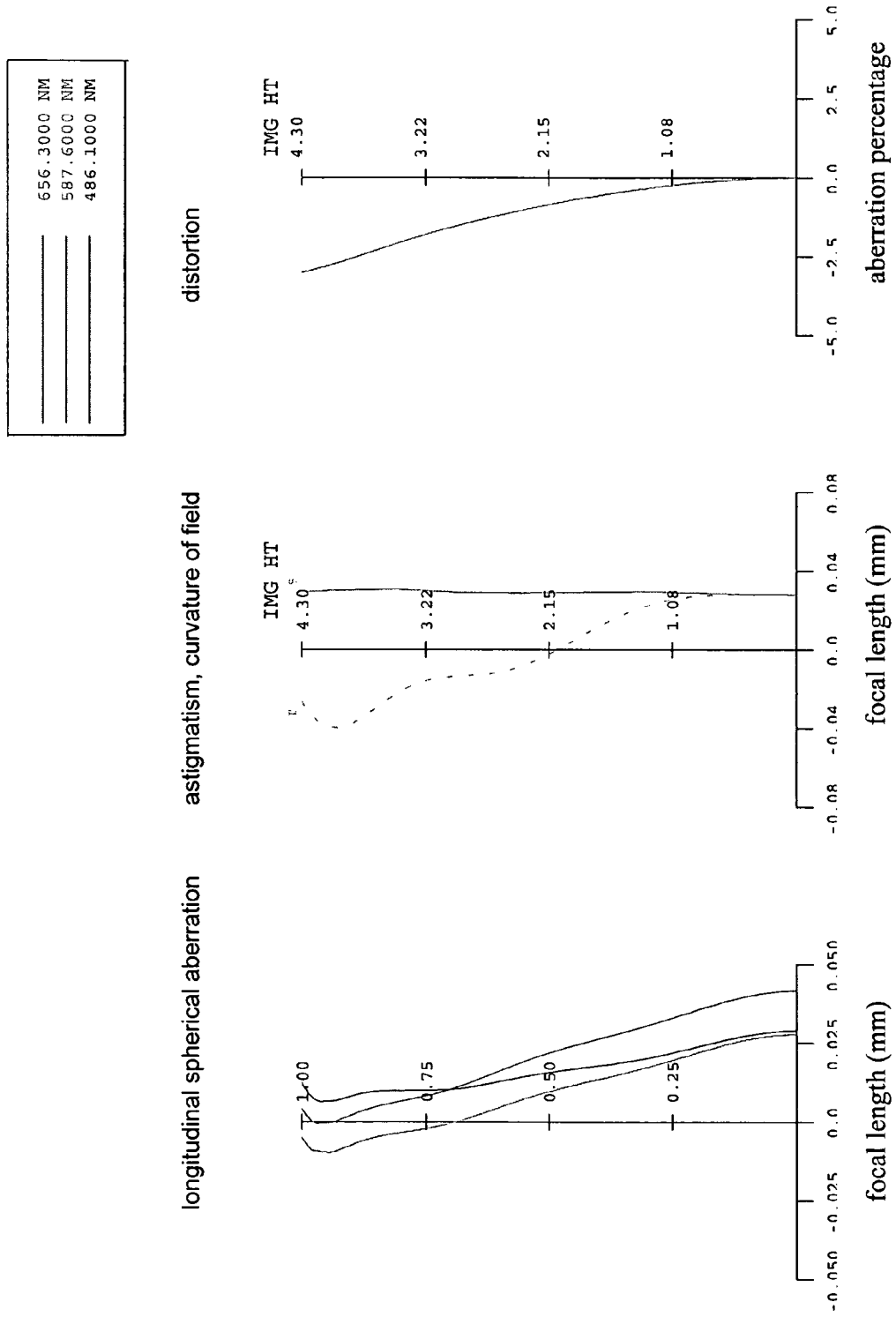
FIG. 5B is an image graph at a large viewing angle according to the fourth embodiment of the present invention.
Figure 5C:
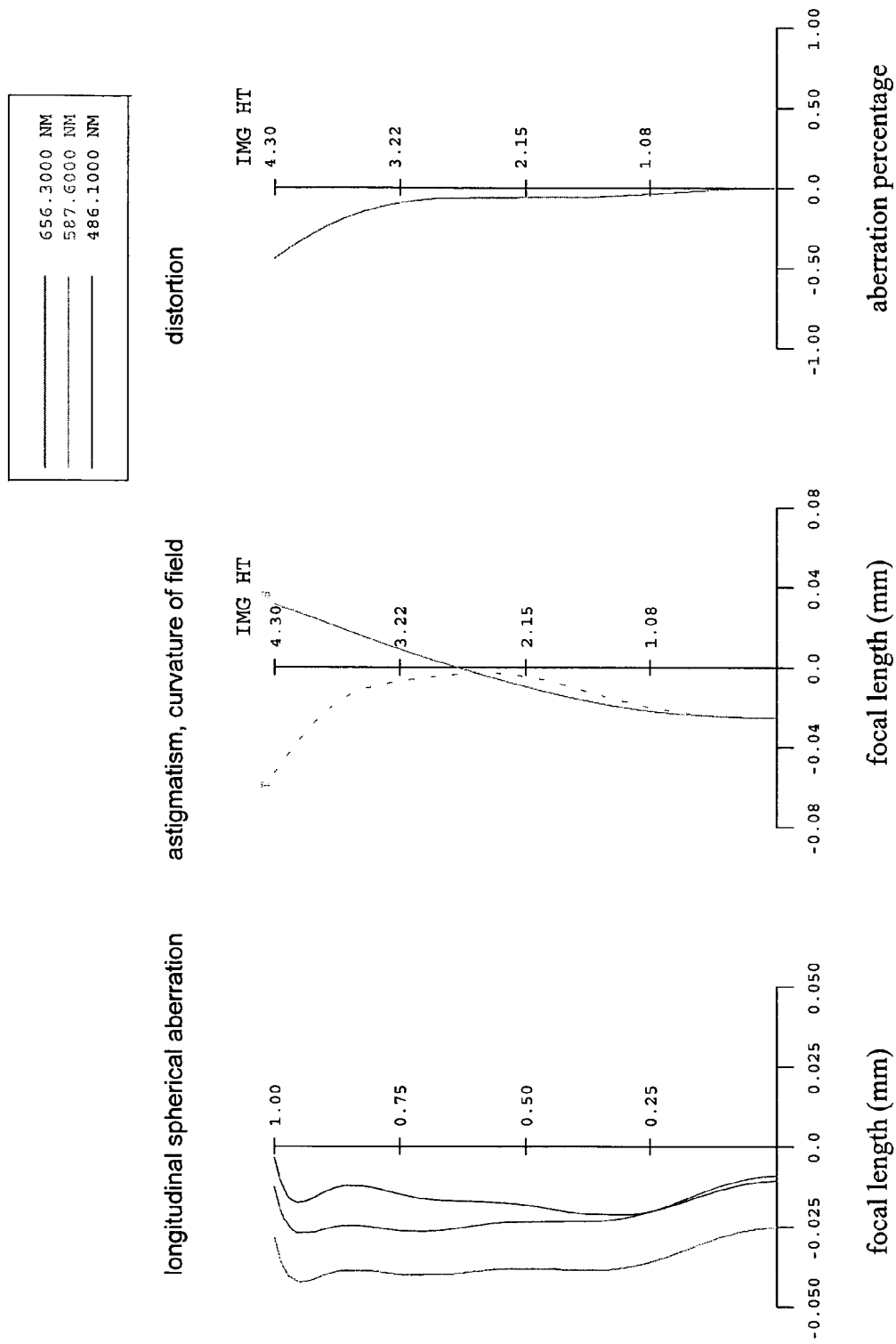
FIG. 5C is an image graph at a moderate viewing angle according to the fourth embodiment of the present invention.
Figure 5D:
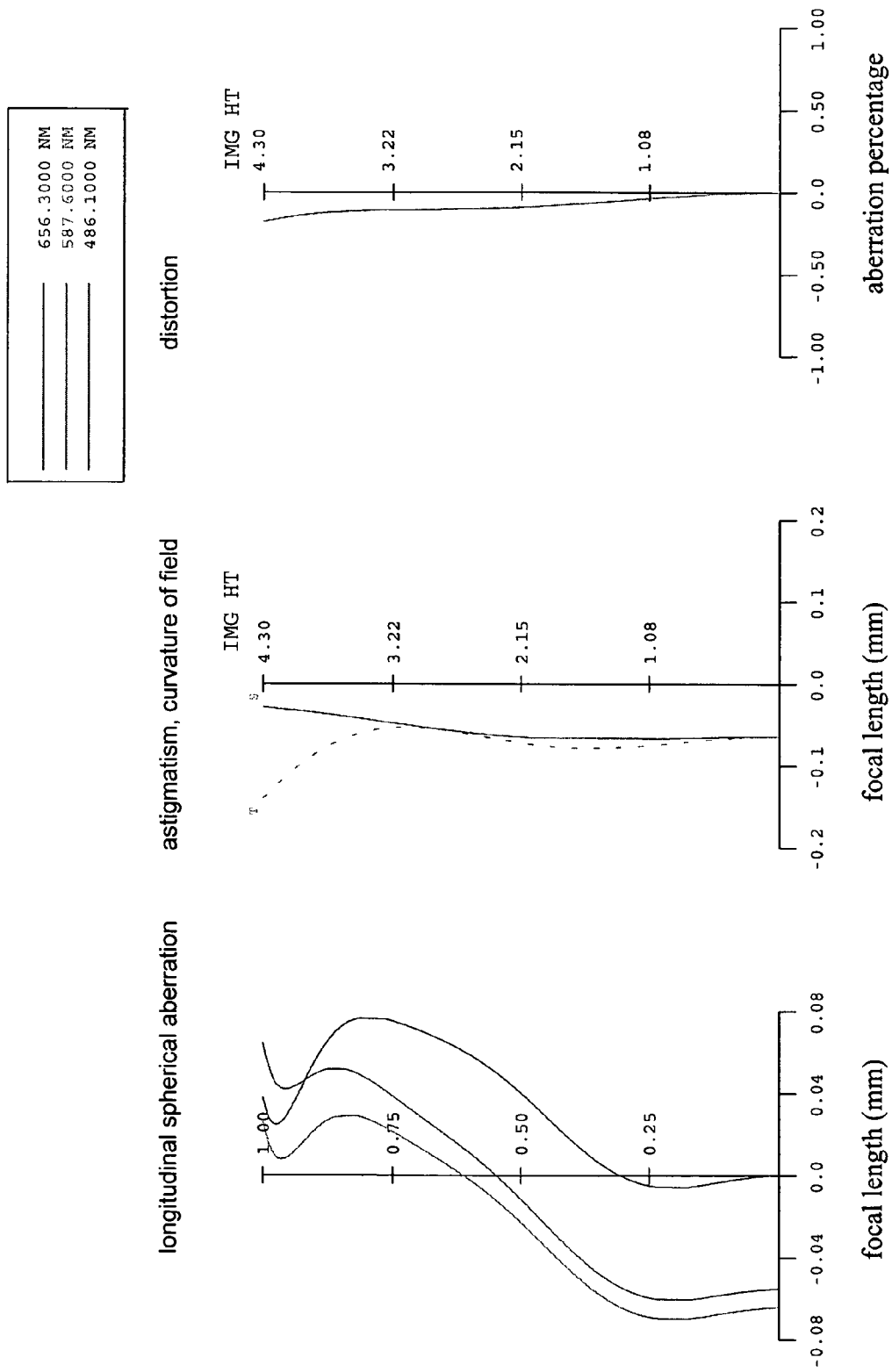
FIG. 5D is an image graph at a small viewing angle according to the fourth embodiment of the present invention.

FIG. 5A is a diagram showing the location of each lens at a large viewing angle according to a fourth embodiment of the present invention. FIG. 5B is an image graph at a wide viewing angle according to the fourth embodiment of the present invention. FIG. 5C is an image graph at a moderate viewing angle according to the fourth embodiment of the present invention. FIG. 5D is an image graph at a small viewing angle according to the fourth embodiment of the present invention.

The elementary optical characteristics of the fourth embodiment are: $F_{no}$=1:3.65–6.81, f=7.45–21.39, w=29.9°–11.2°, where $F_{no}$ represents the aperture of the diaphragm, f represents the system focal length, and w represents the half viewing angle. Reference is made to Table 3 for the data of these parameters. In Table 4, r represents the radius of curvature of each lens surface; d represents the axial distance between the lenses, n represents the index of refraction of each lens surface, v represents the abbe value of each lens surface.

TABLE 4

| surface | r | d | n | v |
|---|---|---|---|---|
| S1 | 15.773 | 1.00 | 1.72824 | 28.44 |
| S2 | 5.460 | 2.27 | | |
| S3 | −23.041 | 1.00 | 1.62040 | 60.29 |
| S4 | 13.489 | 0.10 | | |
| S5 | 9.624 | 2.17 | 1.80517 | 25.40 |
| S6 | 268.499 | d6 | | |
| S7 | infinite | 0.30 | | |
| S8 | A(1) | 1.90 | 1.49175 | 57.45 |
| S9 | A(2) | 0.10 | | |
| S10 | 26.419 | 1.94 | 1.50324 | 59.96 |
| S11 | −6.716 | 2.12 | 1.80517 | 25.40 |
| S12 | −36.304 | 8.98 | | |

TABLE 4-continued

| surface | r | d | n | v |
|---|---|---|---|---|
| S13 | A(3) | 1.00 | 1.52539 | 56.24 |
| S14 | A(4) | d14 | | |
| S15 | infinite | 0.50 | 1.51679 | 64.14 |
| S16 | infinite | 0.50 | | |
| S17 | infinite | 0.60 | 1.51632 | 64.11 |
| S18 | infinite | 0.44 | | |
| S19 | infinite | 0.00 | | |

In the zoom lens, the lens surfaces S8, S9, S13, and S14 are aspheric surfaces with aspheric coefficient data listed below.

| ASPHERIC | CURV | K<br>E | A<br>F | B<br>G | C<br>H | D<br>J |
|---|---|---|---|---|---|---|
| A(1) | 0.16511667 | 0.000000 | 5.57120E−04 | 1.57559E−04 | −2.57494E−05 | 7.91330E−06 |
|  |  | −1.36260E−06 | 1.59556E−07 | −7.72594E−09 | 0.00000E+00 | 0.00000E+00 |
| A(2) | −0.04009566 | 0.000000 | 1.10145E−03 | 2.86650E−04 | −8.14801E−05 | 2.64364E−05 |
|  |  | −4.71727E−06 | 5.00281E−07 | −2.15897E−08 | 0.00000E+00 | 0.00000E+00 |
| A(3) | −0.01699472 | 0.000000 | −1.02054E−02 | 6.60497E−04 | −8.11175E−05 | 3.36940E−06 |
|  |  | 0.00000E+00 | 0.00000E+00 | 0.00000E+00 | 0.00000E+00 | 0.00000E+00 |
| A(4) | 0.06791325 | 0.000000 | −9.65548E−03 | 9.51602E−04 | −1.29765E−04 | 1.28659E−05 |
|  |  | −8.70274E−07 | 3.57138E−08 | −6.26776E−10 | 0.00000E+00 | 0.00000E+00 |

The variables d6 and d14 are related as follows with respect to different zoom positions:

|  | Z1 | Z2 | Z3 |
|---|---|---|---|
| $F_{no}$ | 3.65 | 4.86 | 6.81 |
| f | 7.45 | 12.82 | 21.39 |
| w | 29.9° | 18.4° | 11.2° |
| d6 | 12.59 | 5.36 | 1.33 |
| d14 | 0.50 | 4.09 | 9.85 |

FIG. 5 is a statistics table related to conditions (a) to (h) of the above four embodiments. The miniaturized parameters (OAL/IMA) of the above embodiments are as small as 8.84, much smaller than that in the prior art.

TABLE 5

| No | OAL/IMA | a<br>$d_{12}/\phi_{11}$ | b<br>$e_{13}/d_{13}$ | c<br>$f_2/f_w$ | d<br>n10−n11 | e<br>$n_8$ | f<br>$n_{13}$ | g<br>$v_8$ | h<br>$v_{13}$ |
|---|---|---|---|---|---|---|---|---|---|
| 1 | 8.84 | 1.62 | 1.21 | 1.244 | −0.298 | 1.49176 | 1.58547 | 57.5 | 29.9 |
| 2 | 8.84 | 1.73 | 1.22 | 1.272 | −0.290 | 1.52540 | 1.52540 | 56.2 | 56.2 |
| 3 | 8.84 | 1.44 | 1.23 | 1.222 | −0.291 | 1.49176 | 1.52540 | 57.5 | 56.2 |
| 4 | 8.84 | 1.71 | 1.35 | 1.227 | −0.302 | 1.49176 | 1.52540 | 57.5 | 56.2 | where OAL/IMA is the ratio of the total track to the image sensor size, which is defined as the miniaturized parameter; $d_{12}$ is the axial distance between the sixth lens L6 and the seventh lens L7; $\phi_{11}$ is the radial height of the sixth lens L6; $e_{13}$ is the outer edge thickness of the seventh lens L7, $d_{13}$ is the central thickness of the seventh lens L7; $f_2$ is the focal length of the rear group; $f_w$ is the focal length at large viewing angles; $n_{10}$ is the index of refraction of the fifth lens L5; $n_{11}$ is the index of refraction of the sixth lens L6; $n_8$ is the index of refraction of the fourth lens L4; $n_{13}$ is the index of refraction of the seventh lens L7; $v_8$ is the abbe value of the fourth lens L4; and $v_{13}$ is the abbe value of the seventh lens L7.

According to a preferred embodiment of the present invention, the fifth lens L5 and the sixth lens L6 of the zoom lens are cemented together to form a doublet lens. It is preferred that the condition (d) $0.28 < |n_{10} - n_{11}| < 0.31$ is met, where $n_{10}$ is the index of refraction of the fifth lens L5, and $n_{11}$ is the index of refraction of the sixth lens L6.

From the data of the above preferred embodiments of the present invention, it is also preferred the following conditions (e), (f), (g) and (h) are also met:

(e) $1.49 < n_8 < 1.53$, where $n_8$ is the index of refraction of the fourth lens L4;

(f) $1.52 < n_{13} < 1.59$, where $n_{13}$ is the index of refraction of the seventh lens L7;

(g) $56 < v_8 < 58$, where $v_8$ is the abbe value of the fourth lens L4;

(h) $29 < v_{13} < 57$, where $v_{13}$ is the abbe value of the seventh lens L7.

It is feasible that only one or all of the above conditions are met.

To sum up, the present invention has the following characteristics and functions:

1. The zoom lens of the present invention has a high zoom ratio (as high as 2.87, which is superior to that in the prior art). Moreover, the miniaturized parameter is as small as 8.84, which is much smaller than that in the prior art, thus effectively saving the space and reducing the volume of the image capturing device.

2. The fourth lens L4 and the seventh lens L7 are aspheric lenses made of plastic material, and other lenses are common glass lenses. Because optical devices with aspheric surfaces can compensate aberration in the optical system, lower the cost, and reduce the weight, the present invention also has the advantage of low cost.

3. The fifth lens L5 and the sixth lens L6 can be cemented together to form a doublet lens so as to simplify the assembly process of the zoom lens and thus have the advantage of easy assembly.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. A zoom lens, comprising:

a front group including a first lens, a second lens and a third lens, said first lens being a meniscus negative lens, said second lens being a biconcave lens negative lens, and said third lens being a positive lens; and a rear group including a fourth lens, a fifth lens, a sixth lens and a seventh lens, said fourth lens being a positive lens, said fifth lens being a biconvex lens, said sixth lens being a meniscus negative lens, said seventh lens being a meniscus negative lens, and said fourth and seventh lenses being aspheric lenses made of plastic material;

wherein said zoom lens meets conditions as follows:

(a) $1.42 < d_{12}/\phi_{11} < 1.73$, where $d_{12}$ is an axial distance between said sixth lens and said seventh lens and $\phi_{11}$ is a radial height of said sixth lens;

(b) $1.20 < e_{13}/d_{13} < 1.36$, where $e_{13}$ is an outer edge thickness of said seventh lens and $d_{13}$ is a central thickness of said seventh lens; and (c) $1.2 < f_2/f_w < 1.3$, where $f_2$ is a focal length of said rear group and $f_w$ is a focal length at a large viewing angle.

2. The zoom lens as claimed in claim 1, wherein said fifth and sixth lenses are cemented together to form a doublet lens.

3. The zoom lens as claimed in claim 1, wherein said zoom lens also meets a condition as follows:

$$0.28 < |n_{10} - n_{11}| < 0.31, \qquad (d)$$

where $n_{10}$ is an index of refraction of said fifth lens, and $n_{11}$ is an index of refraction of said sixth lens.

4. The zoom lens as claimed in claim 1, wherein said zoom lens also meets a condition as follows:

$$1.49 < n_8 < 1.53, \qquad (e)$$

where $n_8$ is an index of refraction of said fourth lens.

5. The zoom lens as claimed in claim 1, wherein said zoom lens also meets a condition as follows:

$$1.52 < n_{13} < 1.59, \qquad (f)$$

where $n_{13}$ is an index of refraction of said seventh lens.

6. The zoom lens as claimed in claim 1, wherein said zoom lens also meets a condition as follows:

$$56 < v_8 < 58, \qquad (g)$$

where $v_8$ is an abbe value of said fourth lens.

7. The zoom lens as claimed in claim 1, wherein said zoom lens also meets a condition as follows:

$$29 < v_{13} < 57, \qquad (h)$$

where $v_{13}$ is an abbe value of said seventh lens.

8. The zoom lens as claimed in claim 1, wherein said zoom lens also meets conditions as follows:

(e) $1.49 < n_8 < 1.53$, where $n_8$ is an index of refraction of said fourth lens;

(f) $1.52 < n_{13} < 1.59$, where $n_{13}$ is an index of refraction of said seventh lens;

(g) $56 < v_8 < 58$, where $v_8$ is an abbe value of said fourth lens; and (h) $29 < v_{13} < 57$, $v_{13}$ is an abbe value of said seventh lens.

* * * * *